US008833199B2

(12) United States Patent
Dal Pra'

(10) Patent No.: US 8,833,199 B2
(45) Date of Patent: Sep. 16, 2014

(54) BICYCLE BRAKE CONTROL DEVICE (75) Inventor: Giuseppe Dal Pra', Zane-VI (IT)

(73) Assignee: Campagnolo S.r.l., Vicenza (IT)

( * ) Notice: Subject to any disclaimer, the term of this patent is extended or adjusted under 35 U.S.C. 154(b) by 671 days.

(21) Appl. No.: 11/708,919

(22) Filed: Feb. 21, 2007

(65) Prior Publication Data
US 2007/0204716 A1  Sep. 6, 2007

(30) Foreign Application Priority Data

Feb. 23, 2006  (EP) .................................... 06003694

(51) Int. Cl.
B62K 23/06 (2006.01)
B62L 3/02 (2006.01)

(52) U.S. Cl.
CPC ........................................ B62L 3/02 (2013.01)
USPC ........................................ 74/502.2; 188/24.11

(58) Field of Classification Search
USPC .............. 74/473.14, 473.15, 489, 502.2, 518; 188/24.11
See application file for complete search history.

(56) References Cited

U.S. PATENT DOCUMENTS

| 735,113 | A | * | 8/1903 | Kelland et al. ............. 188/24.18 |
| 1,706,542 | A | * | 3/1929 | Pugh et al. ........................ 74/488 |
| 2,384,728 | A | * | 9/1945 | Crumble ........................ 280/215 |
| 2,586,604 | A | | 2/1952 | Bennett |
| 2,770,980 | A | * | 11/1956 | Millward ........................ 74/489 |
| 2,854,857 | A | * | 10/1958 | Gleasman et al. .............. 74/489 |
| 3,279,779 | A | | 10/1966 | Thomas et al. |
| 3,760,648 | A | * | 9/1973 | Hoffman ........................ 74/489 |
| 3,776,061 | A | * | 12/1973 | Yoshigai ..................... 74/480 R |
| 3,915,029 | A | | 10/1975 | Shimada |
| 3,972,247 | A | | 8/1976 | Armstrong |
| 4,002,350 | A | | 1/1977 | Timbs |
| 4,075,871 | A | | 2/1978 | Burke |
| 4,100,820 | A | | 7/1978 | Evett |
| 4,319,673 | A | | 3/1982 | Kojima |
| 4,454,784 | A | | 6/1984 | Shimano |
| 4,459,871 | A | | 7/1984 | Shimano |

(Continued)

FOREIGN PATENT DOCUMENTS

| CH | 248133 | 4/1947 |
| CN | 1144761 | 3/1997 |

(Continued)

OTHER PUBLICATIONS

CN Office Action dated Sep. 25, 2009—CN Application No. 200710005823.3.

(Continued)

Primary Examiner — Thomas Diaz
(74) Attorney, Agent, or Firm — Volpe and Koenig, P.C.

(57) ABSTRACT

The invention relates to a bicycle brake control device, comprising a support body to be fixed to a handle bar and suitable to receive an end length of a traction cable according to a line, and a brake lever pivoted on the support body for actuating the brake through the traction cable when it is pulled towards the handle bar, the brake lever having a first actuation area at one end, wherein the pivot of the brake lever is arranged at a position which is not intermediate between the intersection of the line with the brake lever, and the first actuation area of the brake lever. Through such a configuration, the length of the brake lever on the side of the first actuation area, i.e. on the useful side of the brake lever, increases.

11 Claims, 8 Drawing Sheets (56) References Cited

U.S. PATENT DOCUMENTS

| | | | |
|---|---|---|---|
| 4,605,240 A | 8/1986 | Ciem et al. | |
| 4,740,001 A | 4/1988 | Torleumke | |
| D298,309 S | 11/1988 | Coue | |
| 4,840,082 A | 6/1989 | Terashima et al. | |
| 4,885,951 A | 12/1989 | Desenclos et al. | |
| 4,930,368 A | 6/1990 | Nagano | |
| 4,945,785 A | 8/1990 | Romano | |
| 4,966,046 A | 10/1990 | Tagawa | |
| 5,012,692 A | 5/1991 | Nagano | |
| 5,020,387 A | 6/1991 | Nagano | |
| 5,050,444 A | 9/1991 | Nishimura | |
| 5,094,120 A | 3/1992 | Tagawa | |
| RE34,007 E | 7/1992 | Desenclos et al. | |
| 5,159,851 A | 11/1992 | Rahmes | |
| 5,186,071 A | 2/1993 | Iwasaki | |
| 5,203,213 A | 4/1993 | Nagano | |
| 5,213,005 A * | 5/1993 | Nagano | 74/502.2 |
| 5,222,412 A | 6/1993 | Nagano | |
| 5,241,878 A | 9/1993 | Nagano | |
| 5,257,683 A | 11/1993 | Romano | |
| 5,279,179 A * | 1/1994 | Yoshigai | 74/502.2 |
| 5,287,765 A * | 2/1994 | Scura | 74/502.2 |
| 5,303,608 A | 4/1994 | Iwasaki | |
| 5,400,675 A | 3/1995 | Nagano | |
| 5,479,776 A | 1/1996 | Romano | |
| 5,480,356 A | 1/1996 | Campagnolo | |
| 5,515,743 A * | 5/1996 | Lumpkin | 74/502.2 |
| 5,528,954 A * | 6/1996 | Yoshigai | 74/489 |
| 5,601,001 A | 2/1997 | Kawakami et al. | |
| 5,676,020 A | 10/1997 | Jordan et al. | |
| 5,676,021 A | 10/1997 | Campagnolo | |
| 5,676,022 A | 10/1997 | Ose | |
| 5,755,139 A | 5/1998 | Kojima | |
| 5,775,173 A * | 7/1998 | Wagner | 74/502.2 |
| 5,787,757 A | 8/1998 | Ozaki | |
| 5,791,195 A | 8/1998 | Campagnolo | |
| 5,806,372 A | 9/1998 | Campagnolo | |
| 5,832,782 A | 11/1998 | Kawakami | |
| 5,896,779 A * | 4/1999 | Biersteker et al. | 74/502.2 |
| 5,900,705 A | 5/1999 | Kimura | |
| 5,921,140 A | 7/1999 | Lemmens et al. | |
| 5,970,816 A | 10/1999 | Savard | |
| 6,073,730 A | 6/2000 | Abe | |
| 6,095,010 A | 8/2000 | Arbeiter | |
| 6,098,488 A * | 8/2000 | Vos | 74/502.2 |
| 6,370,981 B2 | 4/2002 | Watarai | |
| 6,457,377 B1 * | 10/2002 | Hsu | 74/502.2 |
| 6,502,477 B1 | 1/2003 | Assel | |
| 6,553,861 B2 | 4/2003 | Ose | |
| 6,564,670 B2 | 5/2003 | Feng et al. | |
| 6,564,671 B2 | 5/2003 | Ose | |
| 6,647,823 B2 | 11/2003 | Tsumiyama et al. | |
| 6,792,826 B2 | 9/2004 | Dal Pra' | |
| 7,100,471 B2 | 9/2006 | Irie et al. | |
| 2002/0078789 A1 | 6/2002 | Chen | |
| 2002/0104401 A1 | 8/2002 | Dal Pra' | |
| 2002/0124679 A1 | 9/2002 | Dal Pra' | |
| 2002/0139637 A1 | 10/2002 | Tsumiyama et al. | |
| 2003/0094064 A1 | 5/2003 | Dal Pra' | |
| 2003/0167871 A1 | 9/2003 | Irie et al. | |
| 2003/0177855 A1 | 9/2003 | Tsumiyama et al. | |
| 2004/0144193 A1 | 7/2004 | Sato et al. | |
| 2004/0237697 A1 | 12/2004 | Kawakami | |
| 2004/0237698 A1 | 12/2004 | Hilsky et al. | |
| 2005/0241428 A1 | 11/2005 | Tsai | |
| 2006/0070480 A1 | 4/2006 | Fujii | |
| 2006/0207375 A1 | 9/2006 | Jordan et al. | |
| 2006/0272443 A1 | 12/2006 | Tsumiyama | |
| 2007/0034037 A1 | 2/2007 | Dal Pra' et al. | |
| 2007/0068332 A1 | 3/2007 | Fujii et al. | |
| 2007/0137388 A1 | 6/2007 | Dal Pra' | |
| 2007/0137391 A1 | 6/2007 | Fujii | |
| 2007/0178715 A1 | 8/2007 | Fujii | |
| 2007/0186715 A1 | 8/2007 | Dal Pra' | |
| 2007/0193386 A1 | 8/2007 | Fujii | |
| 2007/0204716 A1 | 9/2007 | Dal Pra' | |
| 2008/0098848 A1 | 5/2008 | Dal Pra' et al. | |
| 2008/0196537 A1 | 8/2008 | Dal Pra' | |
| 2008/0210041 A1 | 9/2008 | Dal Pra' et al. | |
| 2008/0210042 A1 | 9/2008 | Dal Pra' | |
| 2009/0025504 A1 | 1/2009 | Dal Pra' et al. | |
| 2009/0031846 A1 | 2/2009 | Dal Pra' et al. | |
| 2009/0133526 A1 | 5/2009 | Dal Pra et al. | |

FOREIGN PATENT DOCUMENTS

| | | |
|---|---|---|
| CN | 2436412 | 6/2001 |
| CN | 1443679 | 9/2003 |
| CN | 1550405 | 12/2004 |
| DE | 3136922 | 3/1983 |
| DE | 3706545 | 9/1988 |
| DE | 19607640 | 1/1997 |
| DE | 202006006796 | 8/2006 |
| EP | 0371254 | 6/1990 |
| EP | 0478901 | 4/1992 |
| EP | 0 504 118 | 9/1992 |
| EP | 0504118 | 9/1992 |
| EP | 0504118 A1 | 9/1992 |
| EP | 0361335 | 2/1994 |
| EP | 0601211 | 6/1994 |
| EP | 0601221 | 6/1994 |
| EP | 0 635 422 | 1/1995 |
| EP | 0635422 | 1/1995 |
| EP | 0714826 | 6/1996 |
| EP | 0744334 | 11/1996 |
| EP | 0790175 | 8/1997 |
| EP | 1123861 | 8/2001 |
| EP | 1134158 | 9/2001 |
| EP | 1245483 | 10/2002 |
| EP | 0785128 | 11/2002 |
| EP | 1264765 | 12/2002 |
| EP | 1342655 | 9/2003 |
| EP | 1440878 | 7/2004 |
| EP | 1 449 756 | 8/2004 |
| EP | 1449756 | 8/2004 |
| EP | 1473220 | 11/2004 |
| EP | 1481883 | 12/2004 |
| EP | 1502847 | 2/2005 |
| EP | 1535829 | 6/2005 |
| EP | 1564131 | 8/2005 |
| EP | 1642823 | 4/2006 |
| EP | 1698550 | 9/2006 |
| EP | 1739001 | 1/2007 |
| EP | 1816066 | 8/2007 |
| EP | 1826111 | 8/2007 |
| FR | 960276 | 4/1950 |
| FR | 2777528 | 10/1999 |
| FR | 2861686 | 2/2006 |
| GB | 615173 | 1/1949 |
| GB | 2012893 | 8/1979 |
| JP | 58003987 | 6/1956 |
| JP | 51060342 | 5/1976 |
| JP | 17893 | 1/1982 |
| JP | 17894 | 1/1982 |
| JP | 58030884 A | 2/1983 |
| JP | 224879 | 12/1983 |
| JP | 60107475 | 6/1985 |
| JP | 157092 | 10/1989 |
| JP | 2088384 | 3/1990 |
| JP | 03292280 | 12/1991 |
| JP | 04331689 | 11/1992 |
| JP | 05097088 A | 4/1993 |
| JP | 05082786 | 11/1993 |
| JP | 05286476 | 11/1993 |
| JP | 06016170 | 1/1994 |
| JP | 07033063 A | 2/1995 |
| JP | 07251784 | 10/1995 |
| JP | 08328679 A | 12/1996 |
| JP | 61241287 | 10/2007 |
| TW | 136125 Y | 6/1990 |
| TW | 510875 | 11/2002 |
| TW | 519089 | 1/2003 |
| TW | 570013 Y | 1/2004 |
| TW | 1223636 | 11/2004 |

(56) References Cited

FOREIGN PATENT DOCUMENTS

| WO | 9218374 | 10/1992 |
|---|---|---|
| WO | 03093094 | 11/2003 |
| WO | 2005044656 | 5/2005 |

OTHER PUBLICATIONS

English translation of CN Office Action dated Sep. 25, 2009—CN Application No. 200710005823.3.
Chinese Office Action, Appl. No. CN 200610090826.7, dated Apr. 3, 2009.
Chinese Office Action, Appl. No. CN 200710005823.3, dated Sep. 25, 2009.
Chinese Office Action, Appl. No. CN 200810082341.2, dated Nov. 30, 2010.
European Search Report, Appl. No. EP 05425458.6, dated Nov. 16, 2005.
European Search Report, Appl. No. EP 05017003.4, dated Dec. 20, 2005.
European Search Report, Appl. No. 06003694.4, dated Jul. 31, 2006.
European Search Report, Appl. No. RS 144832, dated Apr. 16, 2007.
European Search Report, Appl. No. RS 115409, dated Jul. 18, 2007.
European Search Report, Appl. No. RS 115410, dated Jul. 31, 2007.
European Search Report, Appl. No. RS115682, dated Oct. 30, 2007.
European Search Report, Appl. No. 08003760.9, dated Jun. 27, 2008.
European Search Report, Appl. No. EP 08003755.9, dated Jun. 27, 2008.
European Search Report, Appl. No. EP 08022485.0, dated Jul. 2, 2009.
European Search Report, Appl. No. 08005438.0, dated Nov. 5, 2010.
Japanese Office Action, Appl. No. JP 2002-332045, dated Dec. 16, 2008.
Japanese Office Action, Appl. No. JP 2008-550914, dated May 24, 2011.
European Search Report, Appl. No. 08005438.0, dated Nov. 5. 2010.
Japanese Office Action, Appl. No. 2006-176333, dated Aug. 23, 2011.
Taiwan Search Report, Appl. No. 096101651, dated Oct. 5, 2011.
European Search Report, Appl. No. 06003694.4, dated Jul. 31. 2006.
Taiwan Office Action and Search Report, Appl. No. 095121477, dated Nov. 25, 2011.

\* cited by examiner

BICYCLE BRAKE CONTROL DEVICE

FIELD OF INVENTION

The present invention concerns a bicycle brake control device.

BACKGROUND

Known brake control devices typically include a support body to be fixed to the handle bar—to the left for actuating the front brake or to the right for actuating the rear brake—and a brake lever pivoted on the support body for actuating the brake through the pull action of a normally sheathed inextensible cable, when it is pulled towards the handle bar.

In known devices, because the brake cable must be pulled away from the handle bar, the brake cable head is attached to the brake lever on the opposed side, with respect to its pivot, than the actuation area on which the cyclist's fingers other than the thumb rest when he/she grips the handle bar.

In this respect it is to be noted that the resisting arm must be long enough to impose the necessary stroke to the brake cable fixed to the brake lever, considering that the swinging amplitude of the lever is determined by the opening and closing of the hand on the handle bar.

In particular in the case of integrated control devices for controlling also a bicycle derailleur and/or in the case of control devices for a curved handle bar, typical of racing bicycles, the support body is also suitable to be handled by the cyclist during travel, as an alternative to gripping on the handle bar, to allow the bike to be driven. To this end, the support body has an ergonomic shape, comprising an upwards protrusion in its front zone. The cyclist rests the hand palm on the proximal surface of the protrusion or on the upper surface of the support body, in abutment against the protrusion, with the fingers other than the thumb resting on the front surface of the brake lever.

It is also apparent that, even in such alternative driving conditions, the simultaneous ready accessibility to the brake lever for the braking operations should be ensured.

Instead, in the case of the known control devices, in such driving conditions gripping on the control support body, the braking results difficult, especially for cyclists with small hands, because the hand fingers rest on the brake lever essentially at the pivot of the brake lever itself and even also on the same side where the brake cable head is fixed. In the case of known control devices for curved handle bar, more particularly, the brake cable extends along the upper surface of the support body and the pivot of the brake lever is placed well below the line of the brake cable. In the condition gripping on the support body, the hand fingers rest on the upper zone of the lever, namely at or even above the lever pivot.

In other words, with the known control devices it is not possible for the cyclist, from the above mentioned driving condition gripping on the support body, to apply power with all four fingers, and in any case the applied power acts in a less efficient way because the power arm is rather short. The braking efficiency is thus reduced and sometimes the cyclist is forced to move the hand downwards partly leaving the grip on the control device.

The technical problem at the basis of the present invention is to overcome the above mentioned drawbacks of the prior art by providing a bicycle brake control device wherein the actuation is particularly efficient not only from the driving condition gripping on the handle bar, but also from the driving condition resting on the support body of the control device itself.

SUMMARY OF THE INVENTION

The invention relates to a bicycle brake control device, comprising a support body to be fixed to a handle bar and suitable to receive an end length of a traction cable according to a line, and a brake lever pivoted on the support body for actuating the brake trough the traction cable when it is pulled towards the handle bar, the brake lever having a first actuation area at one end, wherein the pivot of the brake lever is arranged in a position that is not intermediate between the intersection of the above mentioned line with the brake lever, and the first actuation area of the brake lever.

Through such a configuration, the length of the brake lever on the side of the first actuation area, which is intended to be used when the cyclist grips the bicycle handle bar, increases. In other words, the length of the brake lever on the useful side of the brake lever increases. In practice, the pivot of the brake lever is displaced towards the area of the support body for abutment of the cyclist's palm in the above mentioned alternative driving conditions. The actuation area or areas of the brake lever in such alternative driving conditions is/are thus on the same side with respect to the brake lever pivot as the first actuation area, and therefore all the cyclist's fingers other than thumb are able to apply an efficient power to the brake lever.

BRIEF DESCRIPTION OF THE DRAWINGS

Features and advantages of the invention will now be illustrated with reference to embodiments represented as a non-limiting example in the accompanying drawings, wherein.

DETAILED DESCRIPTION

Introduction

The invention relates to a bicycle brake control device, comprising a support body to be fixed to a handle bar and suitable to receive an end length of a traction cable according to a line, and a brake lever pivoted on the support body for actuating the brake trough the traction cable when it is pulled towards the handle bar, the brake lever having a first actuation area at one end, wherein the pivot of the brake lever is arranged in a position that is not intermediate between the intersection of the above mentioned line with the brake lever, and the first actuation area of the brake lever.

Typically the line of the end length of the traction cable is defined in the support body by an abutment for a sheath of the brake cable, and by a member holding the head of the traction cable.

Such a line can thus slightly change during the actuation of the brake lever and the consequent shift of the cable head holder. Typically, the variation is maintained within 10°.

Preferably the control device further comprises motion transmission means interposed between the brake lever and a member holding the head of the traction cable.

Through the provision of the transmission means, namely avoiding a direct fixing of the head of the traction cable to the brake lever, it is possible to separate the resisting arm of the brake lever from the necessary stroke of the traction cable head. In this way, it is in particular possible to obtain that the brake lever is actuated with a mechanical advantage, even in driving conditions wherein the hand rests on the support body.

Preferably, the transmission means are configured to pull the member holding the cable head essentially along the above mentioned line.

Through such linear pull of the traction cable, the efficiency of the braking action increases and the wear of the end part of the traction cable is reduced.

Preferably, the transmission means comprises a transmission member pivoted on the support body and rotary moved by the brake lever, the member holding the traction cable head being fixed at a free end of said member pivoted on the support body.

Changing the distance between the pivot of the pivoted member and the cable head holder it is particularly simple to change the stroke of the cable head holder independently of the swinging angle of the brake lever, and also to implement the above mentioned linear pull by providing a long enough distance.

In an embodiment, the transmission member pivoted on the support body is cam coupled on a bend of the brake lever.

Through the cam actuation of the transmission member, the resisting arm can be made particularly short, with a consequent particularly large mechanical advantage.

In other embodiments, the transmission means includes a second transmission member pivoted at one end on the brake lever and pivoted at the other end on the transmission member pivoted on the support body.

Preferably, the pivot of the brake lever is arranged at one end of the brake lever.

In this way the brake lever behaves as a second class lever, always mechanically advantageous, with reference to an actuation area thereof arranged along the lever beyond the application point of the transmission means.

Preferably, the brake lever has at least two actuation areas along its length.

The actuation areas are advantageously intended for abutment of the cyclist's fingers other than the thumb when he/she grips the support body or a protrusion thereof, and respectively the handle bar, and preferably they can be anatomically shaped.

Preferably, the support body is intended to be fixed to a curved handle bar.

In first embodiments, the pivot of the brake lever is arranged on the support body in a position which is above with respect to the above mentioned line.

Through such a configuration, the pivot of the brake lever can be moved particularly towards the upper surface of the support body. When the cyclist grips the support body from above, his/her fingers thus rest on the brake lever in an actuation area below the pivot of the brake lever, and thus they are all able to apply an efficient power to the brake lever.

In another embodiment, the pivot of the brake lever is arranged on the support body in a position which is essentially along the above mentioned line.

Through such a configuration, the pivot of the brake lever can be moved sufficiently towards the upper surface of the support body, so that, when the cyclist grips the support body from above, his/her fingers rest on the brake lever in an actuation area below the pivot of the brake lever, and thus they are all able to apply an efficient power to the brake lever.

Preferably, the support body has a frontal-upper protrusion.

Preferably, the frontal-upper protrusion is grippable.

In this case, preferably the possible transmission means are housed in the protrusion.

The preferred control device further comprises means for controlling a bicycle derailleur.

DETAILED DESCRIPTION OF THE PREFERRED EMBODIMENT(S)

A first embodiment of a brake control device for a curved handle bar bicycle is shown in FIGS. 1 to 4.

The control device, referenced generally with 1, is more particularly an integrated control device, i.e. for controlling not only the brake, but also a derailleur traction cable. However, only a gearshift lever 2 is visible in the figures as the inner mechanism is not the subject-matter of this invention.

Figure 1:
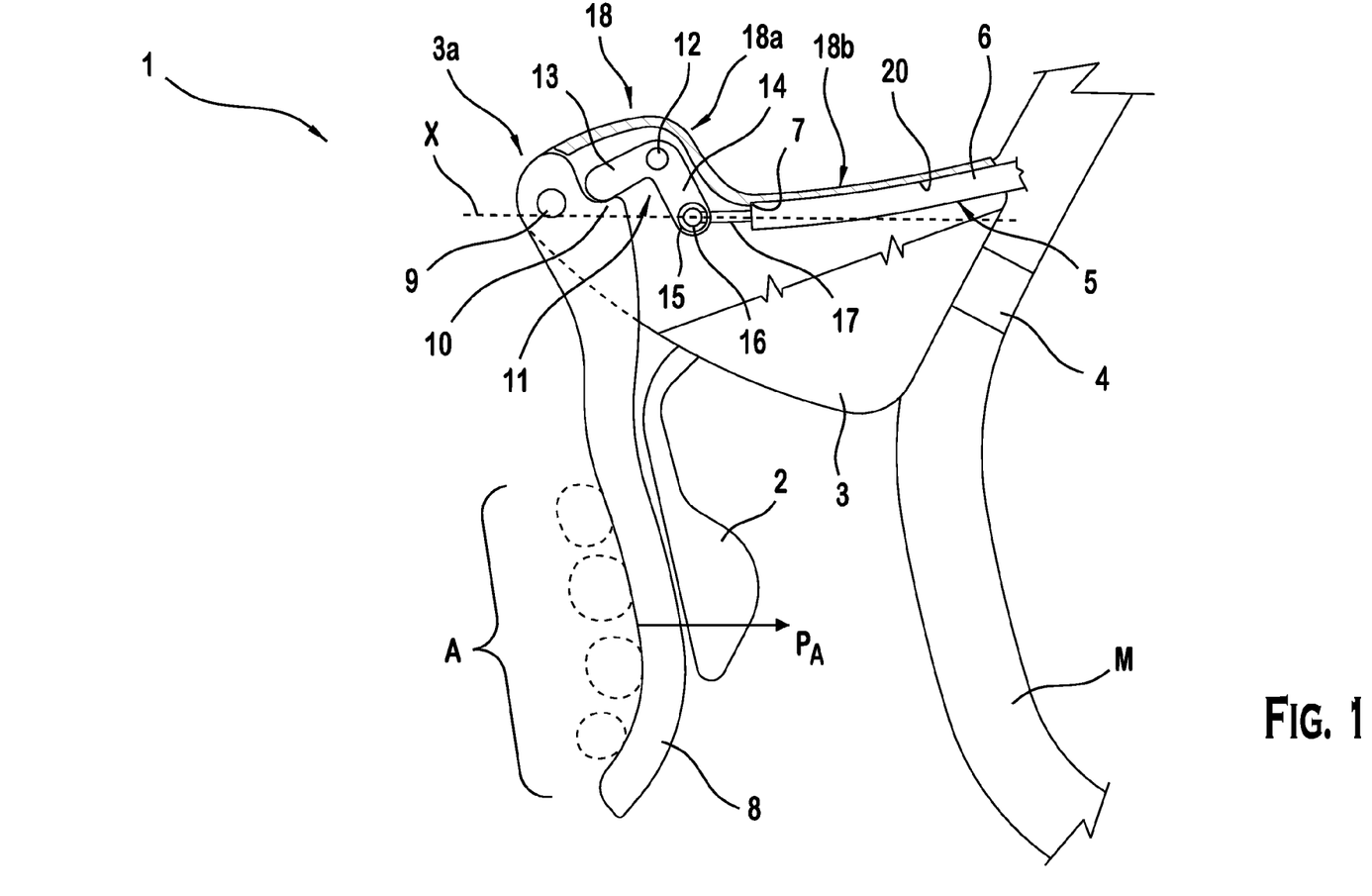
FIG. 1 shows a partially sectional view along a vertical plane of a first embodiment of a control according to the invention, with the brake lever in a rest position.

The control device 1 comprises a support body 3, connectable to a grip portion of a curved handle bar M, for example through a clip 4, so as to protrude frontally from the handle bar M.

The support body 3 has a seat 20 to host a sheathed cable or Bowden cable 5 used for controlling the brake. In particular, the seat 20 extends along the upper surface 18b of the support body 3 and hosts the outer sheath 6 of the Bowden cable 5, which is placed in abutment against an abutment 7 of the support body 3.

A brake lever 8 is pivoted to the upper end 3a of the support body 3 about a pivot 9. The brake lever 8 has a shoulder 10 in the proximity of the pivot 9.

An L-shaped transmission member 11 having branches 13 and 14 on either side of a pivot 12 is interposed between the brake lever 8 and a member 15, holding the head 16 of the inner cable 17 of the Bowden cable 5. The cable head holder 15 is typically a pin having a transversal hole and free to rotate to allow the end length of the inner cable 17 of the Bowden cable 5, fixed in the transversal hole, to take up an essentially straight line X between the abutment 7 and the cable head holder 15 itself.

Advantageously, but not necessarily, the entire seat 20 for the outer sheath 6 of the Bowden cable 5 extends in the support body 3 along line X.

The pivot 9 of the brake lever 8 is above the line X through the end length of the Bowden cable 5. The pivot 9 of the brake lever 8 moreover is preferably arranged at the upper end of the brake lever 8.

The transmission member 11 having the two branches 13 and 14 arranged in an L-shape, or more generally at a suitable angle between them is pivoted on the support body 3 about a pivot 12 at the union of the two branches 13 and 14. The free end of the first branch 13 of the transmission member 11 contacts the shoulder 10 of the brake lever 8, and the free end of the second branch 14 hosts the cable head holder 15.

The upper end of the brake lever 8 and the transmission member 11 are housed in a protrusion 18 of the support body 3.

Figure 2:
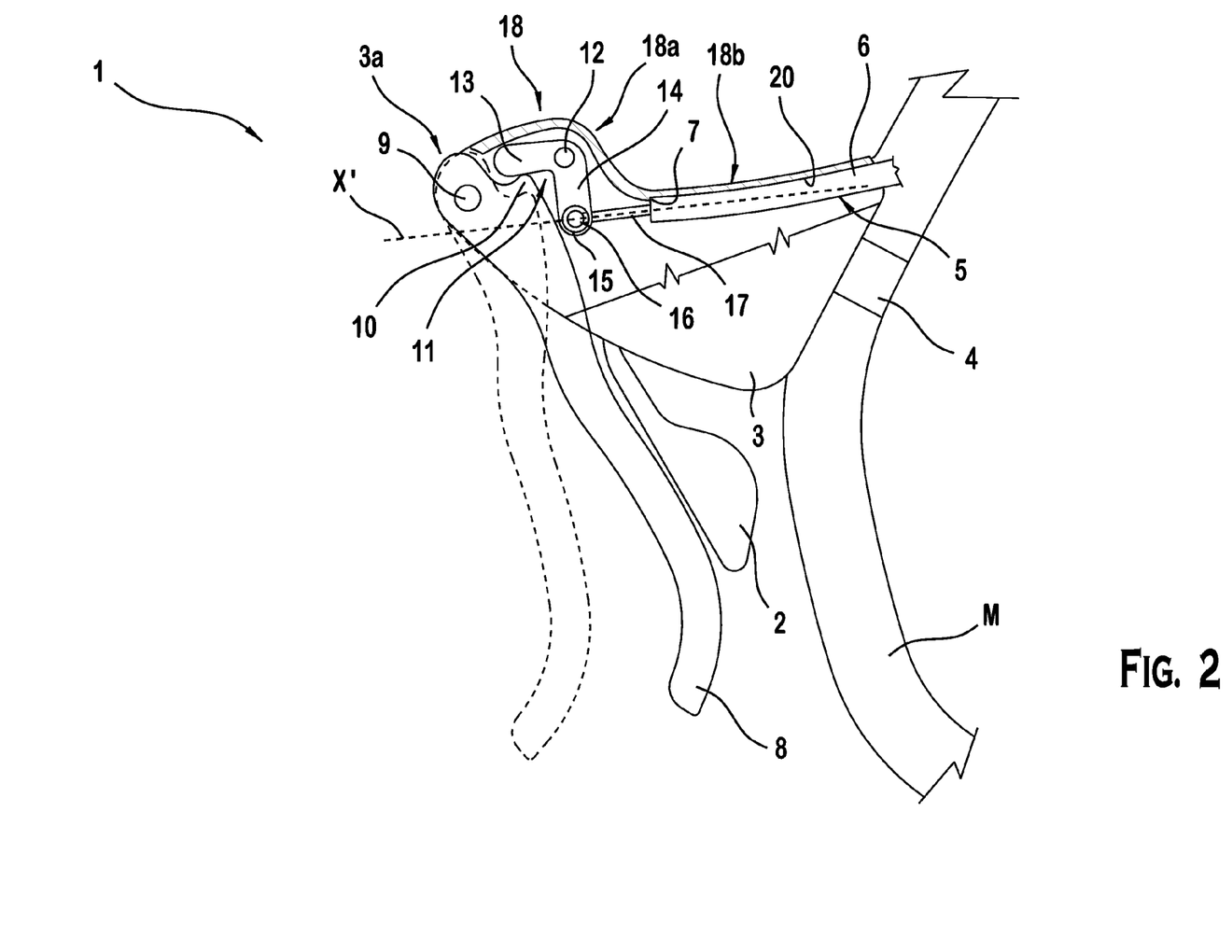
FIG. 2 shows the control of FIG. 1, with the brake lever activated.

When the cyclist pulls the brake lever 8 towards the handle bar M, as shown in FIG. 2, the shoulder 10 of the brake lever 8 pushes the first branch 13 of the transmission member 11 upwards, consequently rotating the transmission member 11 and its second branch 14 about pivot 12, in clockwise direction with reference to FIGS. 1 to 4. The free end of the second branch 14, where there is the member 15 for holding the head 16 of the inner cable 17 of the Bowden cable 5, while rotating causes the traction of the head 16 of the inner cable 17, and so it actuates the braking.

It is preferred that the second branch 14 have a length that advantageously locates its free end so the head 16 of the inner cable 17 of the Bowden cable 5 has an essentially linear displacement along the line X of FIG. 1. It is to be noted in fact that, in the condition wherein the brake lever 8 is pulled, the end length of the inner cable 17 of the Bowden cable 5 extends along a line X' of FIG. 2 which does not differ essentially from line X in FIG. 1. In practice, during the braking movement the end length of the Bowden cable 5 can take up a series of intermediate positions between the lines X and X'. It is however noted that the end length of the Bowden cable 5 is always maintained below the pivot 9 of the brake lever 8.

Cable bending and twisting are in this way advantageously avoided and so the friction with the sheath 6 of the brake cable 5 is reduced, with consequent less wear of the cable 5 and increased efficiency of the braking action.

In FIG. 1, the position of the cyclist's fingers other than the thumb is schematically shown in the driving condition wherein the cyclist grips the handle bar M. The fingers rest on the brake lever 8 at a first actuation area A, at the bottom end of the brake lever 8.

Figure 3:
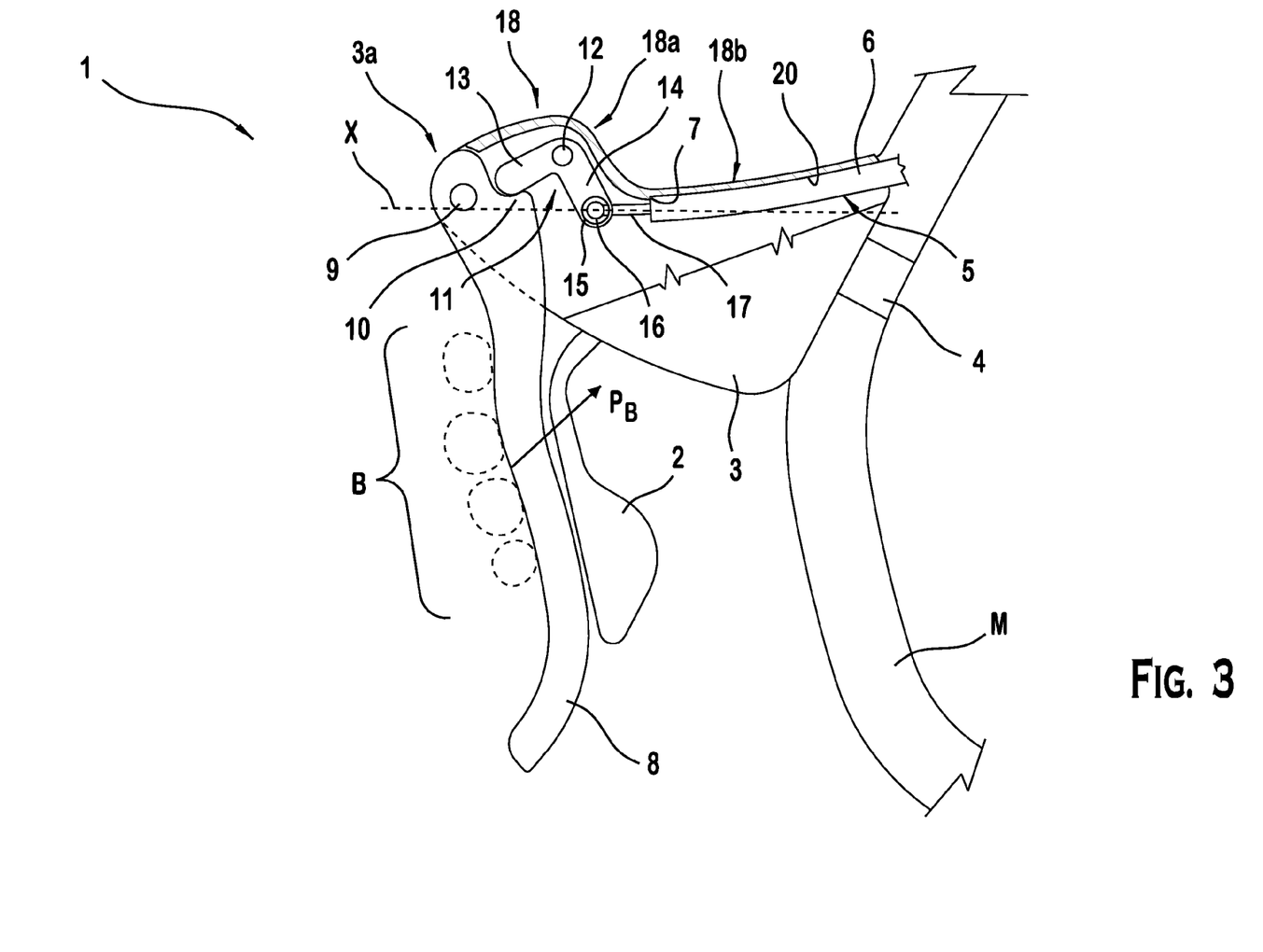
FIGS. 3 and 4 show the control of FIG. 1, in different rider hand positions from FIG. 1.
Figure 4:
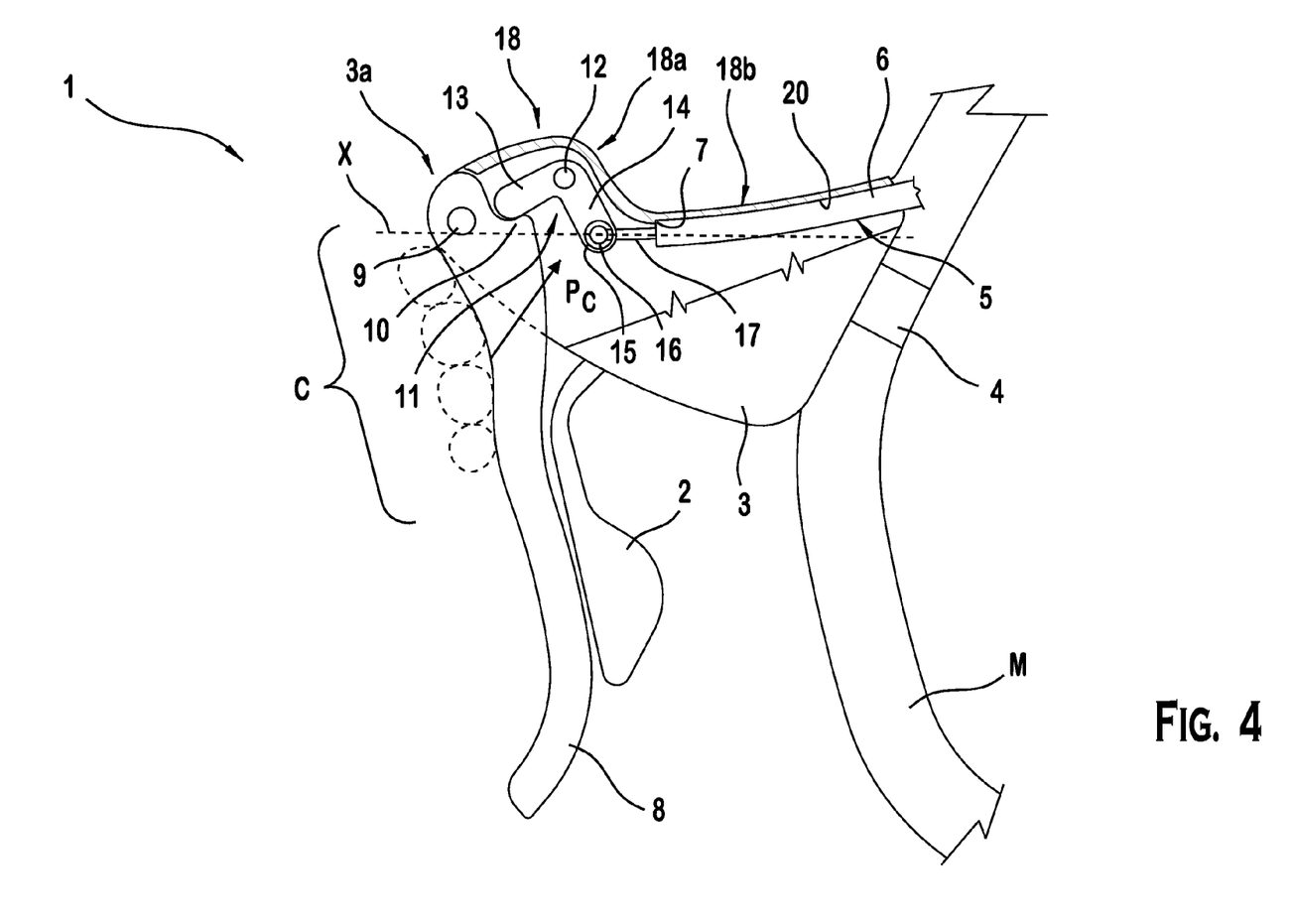

In FIGS. 3 and 4, the positions of the cyclist's fingers other than the thumb are schematically shown in the driving condition wherein the cyclist grips instead the support body 3 of the control device 1.

According to FIG. 3, the cyclist rests the hand palm on the upper surface 18*b* of the support body 3. The fingers rest on the brake lever 8 at a second actuation area B, intermediate along the brake lever 8.

According to FIG. 4, the cyclist grips the protrusion 18 of the support body 3, resting the hand palm on the proximal surface 18*a* of the protrusion 18. The fingers rest on the brake lever 8 at a third actuation area C, towards the upper end of the brake lever 8.

It is to be noted that all the three actuation areas A, B and C extend on the same side of the brake lever 8 with respect to the pivot 9, thanks to the preferred higher location of the pivot 9 of the brake lever 8, above the lines X, X' of the Bowden cable 5. All the cyclist's fingers other than the thumb are so able to apply an efficient power on the brake lever 8.

Moreover, the point of application of the resistance, i.e. the shoulder 10, is interposed between the fulcrum, i.e. pivot 9, and the point of application of the resultant force PA, PB and respectively PC of the power distribution, which is essentially the intermediate point of the actuation area A, B or respectively C. The brake lever 8 of the embodiment of FIGS. 1 to 4 is thus a second class lever, which is always mechanically advantageous, both with reference to the actuation area A and with reference to the actuation area B, as well as with reference to the actuation area C.

Moreover, as the shoulder 10 is positioned on the brake lever 8 in close proximity of the pivot 9, the resisting arm of the brake lever 8 is very short. The transmission means comprised of the transmission member 11 enable the necessary stroke of the inner cable 17 of the Bowden cable 5, for any swinging angle of the lever 8, independently of the resisting arm.

As a result of the short resisting arm of the brake lever 8, the force applied to Bowden cable 5 is large, even when applying a relatively small force.

Summarizing, the brake lever 8 of the control device 1 of the embodiment according to FIGS. 1 to 4 can be efficiently actuated not only from the driving condition gripping on the handle bar, but also from the driving conditions resting on the support body 3 of the control device 1, without the need of moving the hand downwards to move the fingers onto the useful side of the brake lever, i.e. below its pivot and/or to increase the power arm, as it is on the contrary necessary with the control devices of the prior art.

Figure 5:
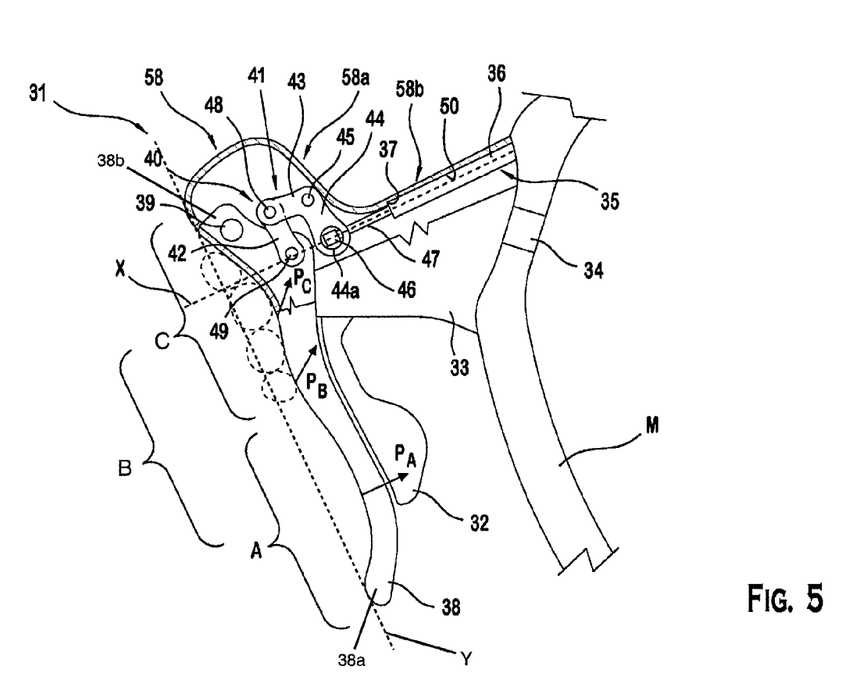
FIG. 5 shows a partially sectional view along a vertical plane of a second embodiment of a control according to the invention, with the brake lever in a rest position.
Figure 6:
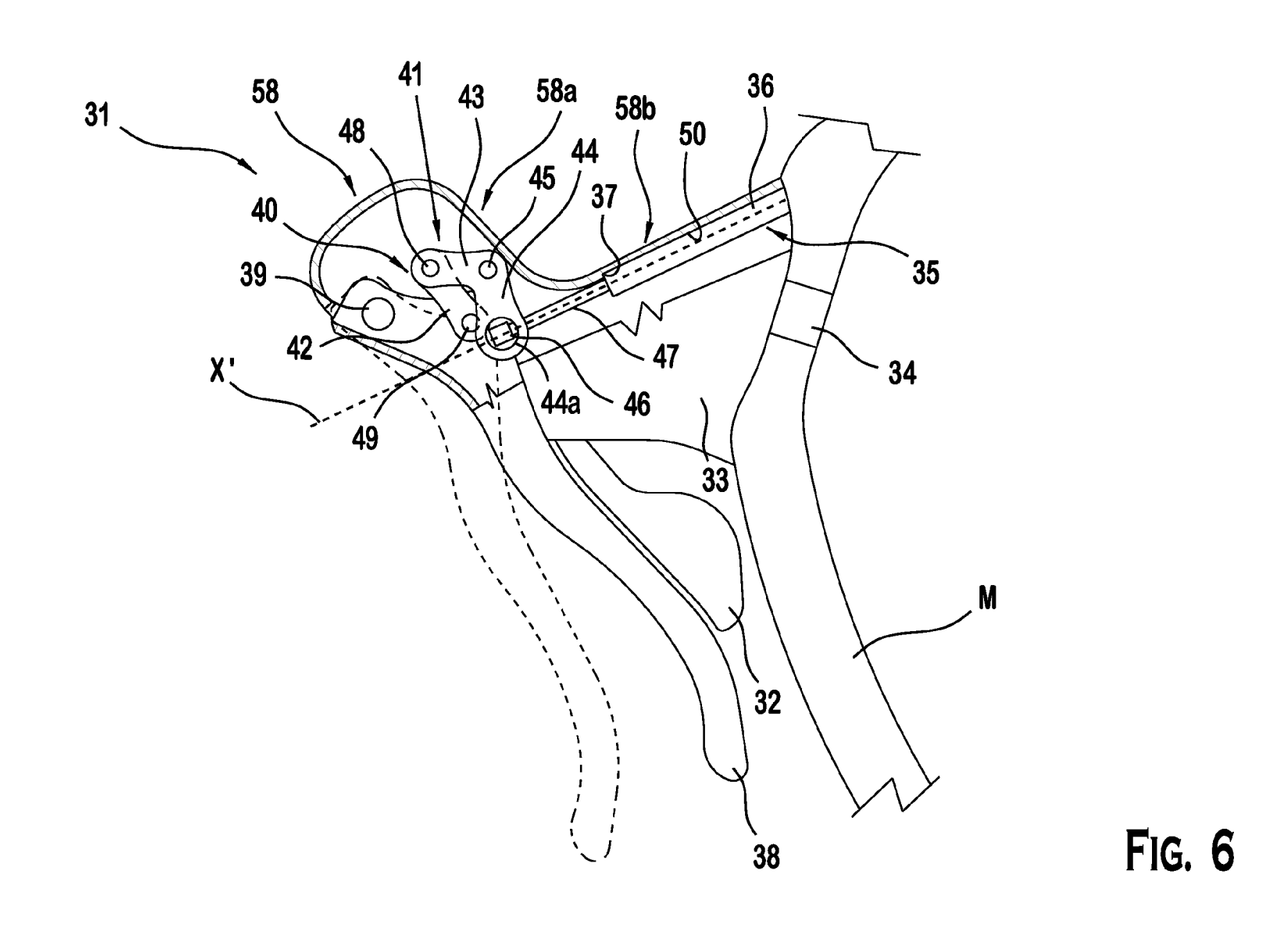
FIG. 6 shows the control of FIG. 5, with the brake lever activated.

In FIGS. 5 and 6, a second embodiment of a brake control device of a bicycle with a curved handle bar is shown, referenced as a whole with 31. Also in the case of this embodiment, it is more particularly an integrated control device, wherein as far as the derailleur gearshifting function is concerned, only a gearshift lever 32 is shown.

The control device 31 comprises a support body 33, connectable to a grip portion of a curved handle bar M, for example through a clip 34, so as to project frontally from handle bar M.

The support body 33 has a seat 50 to house a Bowden cable 35 for controlling the brake. In particular, the seat 50 extends along the upper surface 58*b* of the support body 33, and houses the outer sheath 36 of the Bowden cable 35, which is arranged in abutment against an abutment 37 of the support body 33.

A brake lever 38 is pivoted essentially at the upper end of the support body 33 about a pivot 39. The brake lever 38 has a first terminal end 38*a* and a second terminal end 38*b*, and a plane Y extends from the first terminal end 38*a* to the second terminal end 38*b*. It is to be noted that protrusion 58 of the support body 33 extends in FIGS. 5 and 6 upwards beyond the brake lever 38, but this is not necessary and in particular the support body 33 could have the shape of the support body 3 shown in FIGS. 1 to 4, the brake lever 38 being in this case essentially pivoted at the upper end of the support body.

Transmission means 40 is arranged between the brake lever 38 and a member 44*a* holding the head 46 of the inner cable 47 of the Bowden cable 35. The cable head holder 44*a* is typically a pin with a transversal hole and free to rotate to allow that the end length of the inner cable 47 of the Bowden cable 35, fixed in the transversal hole, takes up an essentially straight line X between the abutment 37 and the cable head holder 44*a* itself.

Advantageously, but not necessarily, the entire seat 50 for the outer sheath 36 of the Bowden cable 35 extends in the support body 33 along line X.

As in the case of the first embodiment described above, the pivot 39 of the brake lever 38 is arranged above with respect to the line X of the end length of the Bowden cable 35. The pivot 39 is also arranged essentially at the upper end of the brake lever 38.

The transmission means 40 comprises first and second transmission members 41 and 42. The first transmission member 41 comprises two branches 43 and 44 arranged in an L-shape, or more generally forming a suitable angle between them, and it is pivoted on the support body 33 about a pivot 45 at the union of the two branches 43 and 44. The free end of the second branch 44 mates with the cable head holder 44*a*. The second transmission member 42 is pivoted on one side to the free end of the first branch 43 of the first transmission member 41 about a pivot 48, and on the other side it is pivoted to the brake lever 38 about a pivot 49. The pivot 49 is arranged in an area of the brake lever 38 essentially along the line X of the Bowden cable 35.

The upper end of the brake lever 38 and the transmission means 40 are housed in the protrusion 58 of the support body 33.

When the cyclist pulls the brake lever 38 towards the handle bar M, as shown in FIG. 6, the free end of the second transmission member 42 is pushed upwards, and in turn it pushes the free end of the first branch 43 of the first transmission member 41 upwards, as a consequence rotating the first transmission member 41 and its second branch 44 about pivot 45, clockwise referring to FIGS. 5 and 6. The free end of the second branch 44 rotates and causes the pull of the head 46 of the inner cable 47 of the Bowden cable 35, and, therefore, it actuates the braking.

Due to the comparably long length of the second branch 44, advantageously its free end and thus the head 46 of the inner cable 47 of the Bowden cable 35 make an essentially linear motion along the line X, avoiding bending and twisting and thus reducing the friction with the sheath 36 of the brake cable 35, with consequent less wear of the cable 35 and increased efficiency of the braking action. In the condition wherein the brake lever 38 is pulled, the end length of the inner cable 47 of the Bowden cable 35 extends along a line X' which is essentially coincident with line X. In practice, during the braking movement the end length of the Bowden cable 35 can take up a series of intermediate positions between the lines X and X', while remaining below the pivot 49 of the brake lever 38.

In FIG. 5, the three actuation areas A, B and C are shown in the driving conditions wherein the cyclist grips the handle bar M, wherein the cyclist rests the hand palm on the upper surface 58b of the support body 33, and wherein the cyclist grips the protrusion 58 of the support body 33, resting the hand palm on the proximal surface 58a of the protrusion 58. For reasons of clarity, the position of the fingers is only shown with reference to the actuation area C, which is the most critical area. The respective resultant forces PA, PB, PC of the power distribution are also shown.

It should be noted that all the three actuation areas A, B and C on the brake lever 38 are below the pivot 39 of the brake lever 38. All the cyclist's fingers other than the thumb are thus able to apply an effective power to the brake lever 38.

The brake lever 38 of the embodiment of FIGS. 5 and 6 is a mechanically advantageous second class lever, with reference to actuation areas A and B.

With reference to actuation area C, the ring finger, the medium finger and the little finger also work in the mechanically advantageous conditions of a second class lever. Moreover, also the forefinger applies an effective power because it is below pivot 39, even if it works in a condition essentially of indifference or of mechanical disadvantage. The overall power PC applied to the brake lever 38 is thus comparably large. Moreover, the arm of the resultant PC of the power distribution is in any case longer than the resisting arm. Also with reference to actuation area C, the brake lever 38 is therefore a mechanically advantageous second class lever.

The transmission means 40 also enables the necessary stroke of the inner cable 47 of the Bowden cable 35, for any swinging angle of the lever 38, independently of the resisting arm.

Summarizing, the brake lever 38 of the control device 31 of the embodiment according to FIGS. 5 and 6 can be efficiently actuated not only from the driving condition gripping on the handle bar, but also from the driving conditions resting on the support body 33 of the control device 31, without the need of moving the hand downwards to bring the fingers on the useful side of the brake lever, i.e. below the pivot and/or to increase the power arm, as it is necessary with the control devices of the prior art.

Figure 7:
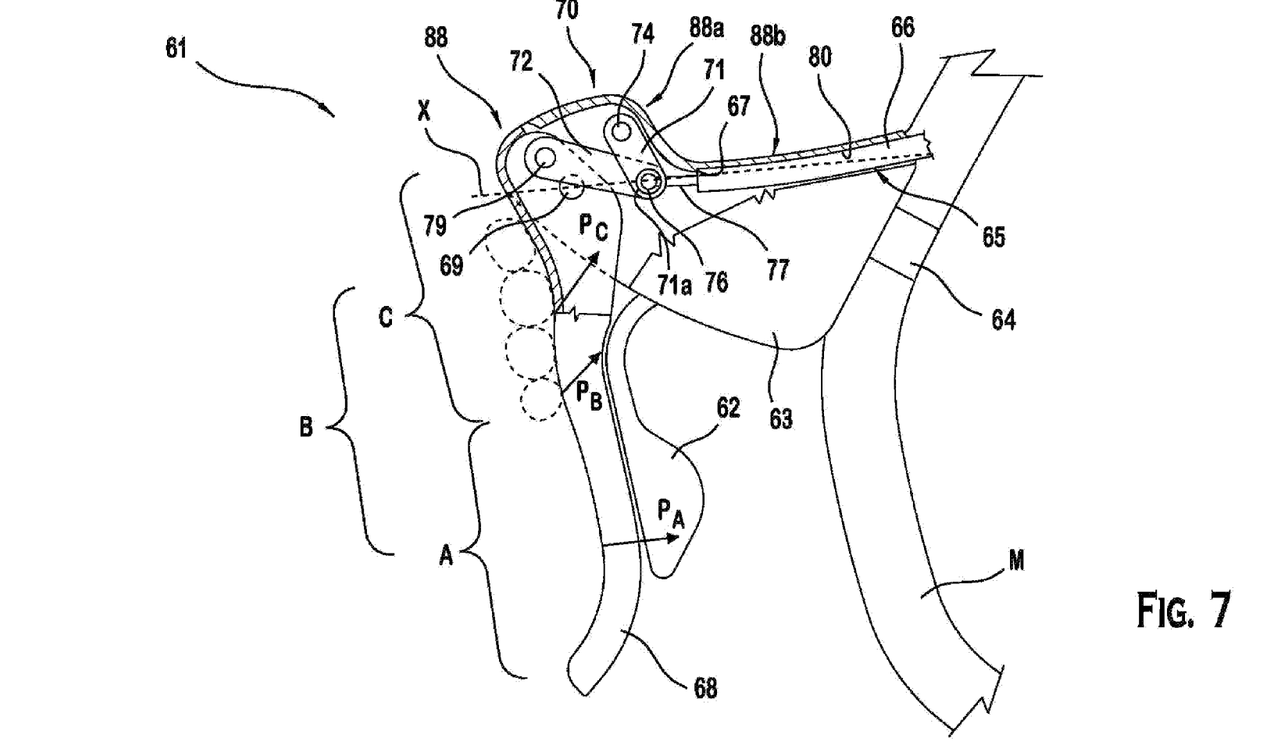
FIG. 7 shows a partially sectional view along a vertical plane of a third embodiment of a control according to the invention, with the brake lever in a rest position.
Figure 8:
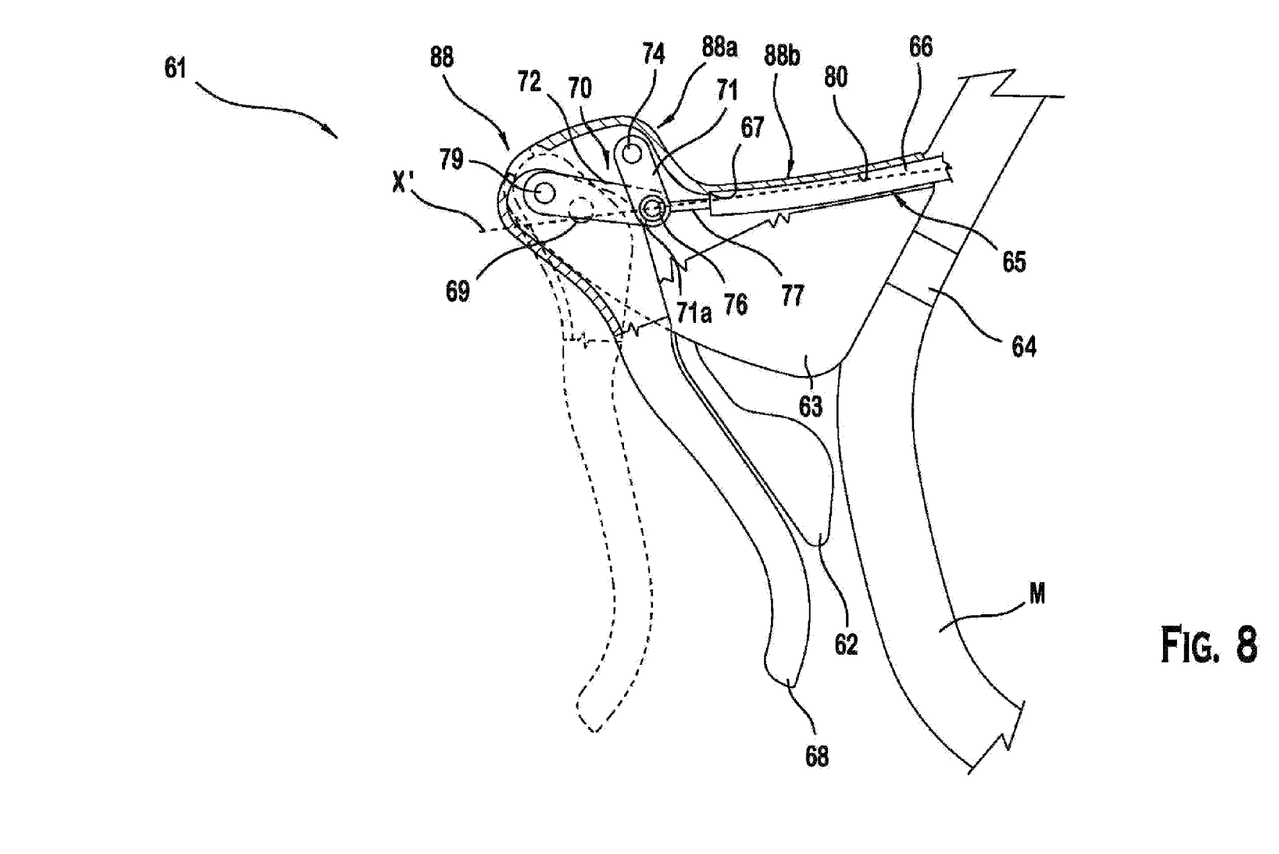
FIG. 8 shows the control of FIG. 7 with the brake lever activated.

In FIGS. 7 and 8, a third embodiment of a brake control device of a curved handle bar bicycle is shown, referenced as a whole with 61. Also in the case of this embodiment, it is more particularly an integrated control device, wherein as far as the derailleur gearshifting function is concerned, only a gearshift lever 62 is shown.

The control device 61 comprises a support body 63, connectable to a grip portion of a curved handle bar M, for example through a clip 64, so as to frontally protrude from the handle bar M.

The support body 63 has a seat 80 for housing a Bowden cable 65 for controlling the brake. In particular, the seat 80 extends along the upper surface 88b of the support body 63, and it houses the outer sheath 66 of the Bowden cable 65, which is arranged in abutment against an abutment 67 of the support body 63.

A brake lever 68 is pivoted to the support body 63 about a pivot 69.

Transmission means 70 is interposed between the brake lever 68 and a member 71a holding the head 76 of the inner cable 77 of the Bowden cable 65. The cable head holder 71a is typically a pin having a transversal hole and free to rotate to allow the end length of the inner cable 77 of the Bowden cable 65, fixed in the transversal hole, to take up an essentially straight line X between the abutment 67 and the cable head holder 71a itself.

Advantageously, but not necessarily, the entire seat 80 for the outer sheath 66 of the Bowden cable 65 extends in the support body 63 along the line X.

The pivot 69 of the brake lever 68 is arranged essentially on the line X of the end length of the Bowden cable 65.

The transmission means 70 comprises first and second transmission members 71 and 72. The first transmission member 71 is pivoted at a first end on the support body 63 about a fixed pivot 74. At its second end, the first transmission member 71 houses the cable head holder 71a. The second transmission member 72 is pivoted at a first end to the second end of the first transmission member 71, at the cable head holder 71a, and at the other end it is pivoted to the brake lever 68 about a pivot 79 in an upper end area of the brake lever 68, and preferably above the fixed pivot 69.

The upper end of the brake lever 68 and the transmission means 70 are housed in a protrusion 88 of the support body 63.

When the cyclist pulls the brake lever 68 towards the handle bar M, as shown in FIG. 8, the second transmission member 72 is pulled away from the handle bar M and in turn it pulls the free end of the first transmission member 71, rotating it about the pivot 74 in a clockwise direction with reference to FIGS. 7 and 8. The free end of the first transmission member 71, where there is the cable head holder 71a, when rotating causes the traction of the head 76 of the inner cable 77 of the Bowden cable 65, and so it actuates the braking.

Because of the comparably long length of the first transmission member 71, advantageously its free end and thus the head 76 of the inner cable 77 of the Bowden cable 65 make an essentially linear displacement along line X, avoiding bending and twisting and thus reducing friction with the sheath 66 of the brake cable 65, with consequent less wear of the cable 65 and increased efficiency of the braking action. In the condition when the brake lever 68 is pulled, the end length of the inner cable 77 of the Bowden cable 65 extends along a line X' only slightly differing from line X. In practice, during the braking movement the end length of the Bowden cable 35 can take up a series of intermediate positions between lines X and X', while remaining below the pivot 69 of the brake lever 68.

In FIG. 7, three actuation areas A, B, C are shown in the driving conditions wherein the cyclist grips the handle bar M, wherein the cyclist rests the hand palm on the upper surface 88b of the support body 63, and wherein the cyclist grips the protrusion 88 of the support body 63, resting the hand palm on the proximal surface 88a of the protrusion 88. For clarity, the position of the fingers is shown only with reference to the actuation area C, which is the most critical area. The respective resultant forces PA, PB, PC of the power distribution are also shown.

It is noted that the actuation areas A, B and essentially the entire actuation area C extend on the same side of the brake lever 68 with respect to pivot 69, thanks to the upper arrangement of the pivot 69 of the brake lever 68, above the line X, X' of the Bowden cable 65. All of the cyclist's fingers, other than the thumb, are thus able to apply an efficient power to the brake lever 68 in the driving conditions wherein the cyclist grips the handle bar M and wherein the cyclist rests the hand palm on the upper surface 88b of the support body 63. In the driving condition wherein the cyclist grips the protrusion 88 of the support body 63, at least the medium finger, the ring finger and the little finger are able to apply an efficient power to the brake lever 68, even if the forefinger may also fall essentially at the pivot 69 of the brake lever 68.

The brake lever 68 of the embodiment of FIGS. 7 and 8 is a first class lever both with reference to the actuation area A and with reference to the actuation area B.

With reference to the actuation area C, the medium finger, the ring finger and the little finger work in conditions of mechanical advantage because the arm of their respective powers is greater than the resisting arm. Furthermore, also the forefinger applies an efficient power because it rests below the pivot 69, even if it works in essentially indifference or mechanical disadvantage conditions. The total power applied to the brake lever 68 is therefore comparably large. Furthermore, the arm of the resultant force of the power distribution PC is in any case longer than the resisting arm. Also with reference to the actuation area C, the brake lever 68 is therefore a mechanically advantageous lever.

The transmission means 70 also allow the necessary stroke of the inner cable 77 of the Bowden cable 65 to be obtained, for any swinging angle of the lever 68, independently of the resisting arm, that can therefore be made comparably short.

Summarizing, the brake lever 68 of the control device 61 of the embodiment according to FIGS. 7 and 8 can be actuated not only from the driving condition gripping on the handle bar, but also from the driving conditions resting on the support body 63 of the control device 61, without the need of displacing the hand downwards to bring the fingers on the useful side of the brake lever, namely below the pivot and/or to increase the power arm, as it is on the contrary necessary with the control devices of the prior art.

In the various embodiments described above, the actuation areas A, B, C may be anatomically shaped on the brake lever 8, 38, 68.

It will be understood that the invention may find an advantageous application also in the case of brake control devices not integral with the derailleur control, as well as to integral or not integral control devices for bicycles not with a curved handle bar, for example for bicycles with straight handle bar as it is typical of the mountain bikes, if it is desired to provide for the capability of actuating the brake not only from its end actuation area intended for the grip on the handle bar, but also from driving conditions wherein the cyclist grips the support body of the control device and therefore he/she does not reach said actuation area with the fingers.

What is claimed is:

1. A bicycle control device comprising:
    a support body fixed to a handle bar at a first surface, a second intermediate surface that extends from the first surface toward a third surface that is spaced apart from the first surface, wherein the first surface includes an aperture suitable to receive an end length of a brake cable and a seat extending along the second intermediate surface toward the third surface that is suitable to receive a sheath of the brake cable,
    the brake cable extends through the seat in an essentially straight line and connects with a free end of one leg of an angled transmission link that is connected to an upper end of the support body through a first fixed pivot that is positioned above an extension of the essentially straight line defined by the brake cable and is connected to a free end of a second transmission link;
    a brake lever that is connected to the upper end of the support body through a second fixed pivot that is opposite the first fixed pivot and positioned above or at the extension of the essentially straight line defined by the brake cable, and is connected to the angled transmission link via the second transmission link;
    whereby, movement of the brake cable lever from a rest position toward a braking position causes actuation of the angled transmission link and the second transmission link, and the brake cable maintains its essentially straight line while the brake lever moves to the braking position.

2. Control device according to claim 1, further comprising a bicycle derailleur control.

3. Control device according to claim 1, wherein said support body is grippable.

4. Control device according to claim 1, wherein the second fixed pivot of the brake lever is arranged on the support body in a position that is above said essentially straight line.

5. Control device according to claim 1, wherein the support body has a frontal-upper protrusion.

6. Control device according to claim 5, wherein the frontal-upper protrusion is grippable.

7. Control device according to claim 1, wherein the brake lever has at least two actuation areas along its length.

8. Control device according to claim 7, wherein the at least two actuation areas are each configured to be gripped.

9. Control device according to claim 1 wherein the angled transmission link and the second transmission link form a motion transmission element interposed between the brake lever and the brake cable.

10. Control device according to claim 9, wherein the motion transmission element pulls the brake cable along said essentially straight line.

11. Control device according to claim 9, wherein the support body has a frontal-upper protrusion, and the motion transmission element is housed in the protrusion.

* * * * *

UNITED STATES PATENT AND TRADEMARK OFFICE
CERTIFICATE OF CORRECTION

PATENT NO. : 8,833,199 B2  
APPLICATION NO. : 11/708919  
DATED : September 16, 2014  
INVENTOR(S) : Giuseppe Dal Prà

Page 1 of 1

It is certified that error appears in the above-identified patent and that said Letters Patent is hereby corrected as shown below:

On the Title Page, in Item (75), under "Inventor", in Column 1, Line 1, delete "Zane-VI" and insert -- Zané-VI --, therefor.

Signed and Sealed this
Tenth Day of February, 2015

Michelle K. Lee
*Deputy Director of the United States Patent and Trademark Office*